(12) United States Patent
Jeong et al.

(10) Patent No.: US 7,893,133 B2
(45) Date of Patent: Feb. 22, 2011

(54) ADHESION ENHANCER FOR POLYMER COMPOSITION SUBSTRATE AND POLYMER COMPOSITION CONTAINING THE SAME

(75) Inventors: Sang-Ok Jeong, Busan-si (KR); Wan-Ouk Kim, Seoul (KR); Young-Kyong Lee, Kimhae-si (KR); Kyung-Man Choi, Busan-si (KR); Chang-Won Lee, Busan-si (KR); Ji-Eun Lee, Busan-si (KR); Young-Min Kim, Busan-si (KR)

(73) Assignees: Nanotech Ceramics Co., Ltd (KR); Korea Institute of Footwear & Leather Technology (KR)

( * ) Notice: Subject to any disclaimer, the term of this patent is extended or adjusted under 35 U.S.C. 154(b) by 158 days.

(21) Appl. No.: 11/503,010

(22) Filed: Aug. 11, 2006

(65) Prior Publication Data

US 2007/0037904 A1    Feb. 15, 2007

(30) Foreign Application Priority Data

Aug. 12, 2005    (KR) ................ 10-2005-0074244

(51) Int. Cl.
*C08K 5/05* (2006.01)
*C08K 5/13* (2006.01)
*C08K 3/08* (2006.01)
*C08K 3/10* (2006.01)
*C08K 3/18* (2006.01)
*C08K 3/22* (2006.01)
*C08K 3/32* (2006.01)
*C08K 3/34* (2006.01)

(52) U.S. Cl. ............... 523/218; 524/323; 524/379; 524/413; 524/414; 524/433; 524/434; 524/441; 524/442; 524/448

(58) Field of Classification Search ........... 523/218; 524/323, 379, 413, 414, 433, 434, 441, 442, 524/448

See application file for complete search history.

(56) References Cited

U.S. PATENT DOCUMENTS

| 5,391,665 | A | * | 2/1995 | Matsunaga et al. | .......... 526/211 |
| 5,777,013 | A | | 7/1998 | Gardiner et al. | |
| 5,853,895 | A | * | 12/1998 | Lewno | .............. 428/425.6 |
| 2005/0173803 | A1 | * | 8/2005 | Lu et al. | .............. 257/759 |

FOREIGN PATENT DOCUMENTS

| JP | 04-091168 | 3/1992 |
| KR | 10-2004-0098913 | 11/2004 |

* cited by examiner

*Primary Examiner*—Kriellion A Sanders
(74) *Attorney, Agent, or Firm*—The Farrell Law Firm, P.C.

(57) ABSTRACT

The present invention provides an adhesion enhancer and a polymer composition containing the adhesion enhancer for enhancing the adhesion performance of polymer composition substrates to a primer. The adhesion enhancer of the present invention includes an alcohol, a phenol or another organic compound having a hydroxyl group of the alcohol or phenol and another functional group as supported by a porous material, or a master batch prepared by mixing a polymer with the above organic compound as supported on a porous material. The polymer composition substrate obtained by adding more than 0.5 part by weight of the adhesion enhancer based on 100 parts by weight of the polymer to a normal polymer composition shows good adhesion to a primer having an isocyanate group without a separate process of making a coarse surface of the substrate or an abrasion process using an organic solvent.

9 Claims, 7 Drawing Sheets

ADHESION ENHANCER FOR POLYMER COMPOSITION SUBSTRATE AND POLYMER COMPOSITION CONTAINING THE SAME

PRIORITY

This application claims priority under 35 U.S.C. §119 to an application entitled "Adhesion enhancer for Polymer Composition Substrate and Polymer Composition Containing the Same" filed in the Korean Intellectual Property Office on Aug. 12, 2005 and assigned Serial No. 2005-74244, the contents of which are incorporated herein by reference.

BACKGROUND OF THE INVENTION

1. Field of the Invention

The present invention relates to an adhesion enhancer used for enhancing adhesion between a primer and a polymer composition substrate, and a polymer composition containing the adhesion enhancer. More specifically, the present invention relates to an adhesion enhancer and a polymer composition containing the adhesion enhancer, which can be added to the polymer composition so as to enhance adhesion of polymer composition substrates obtained from the polymer composition to a primer applied to increase the adhesion performance of the substrates prior to applying an adhesive in combining the substrates together.

2. Description of the Related Art

Generally, there are two methods of joining a plurality of substrates obtained from a polymer composition; 1) using an adhesive alone to join the substrates into a polymer substrate/adhesive/polymer substrate sandwich and 2) using both a primer and an adhesive to get a polymer substrate/primer/adhesive/primer/polymer substrate sandwich.

Specifically, the second method involves preparing polymer composition substrates coated with a primer, which is capable of coupling with the polymer composition substrates, and then joining the polymer composition substrates using an adhesive.

There are several methods of increasing adhesion between the adhesive and the substrates obtained from the polymer composition—promoting the adhesion performance of the adhesive, or improving the performance of adhesion-related materials such as the primer, or the like.

The methods most widely used in the footwear industry are surface-processing methods for processing the surface of polymer composition substrates to be joined, and a method of adding an adhesion-enhancing material to the polymer composition. These methods are to make the primer well bonded to the polymer composition substrates.

Due to difficulty in joining a plurality of the polymer composition substrates with an adhesive alone, the surface of one polymer composition substrate is coated with a primer and then an adhesive and bonded to the other polymer composition substrates.

To improve the performance of such primers, there have been developed a variety of primer compositions, which achieve good adhesion to a specific polymer composition substrate solely rather than all kinds of polymer composition substrates.

Primers, despite their remarkably improved performance, show a deterioration in adhesion performance to a specific polymer composition substrate, so in many cases the polymer composition substrate is surface-processed before being coated with a primer. In other words, to enhance the adhesion performance of the polymer composition substrate to the primer, the one polymer composition substrate is separately surface-processed in different ways, coated with the primer and then an adhesive, and bonded to the other polymer composition substrates.

The various surface-processing methods for polymer composition substrates may include UV irradiation, corona discharge exposure, acid etching, plasma process, solvent cleaning, polishing process using a polishing compound, or the like. Among these methods, polishing process using a polishing compound and UV irradiation are now most widely used in the footwear industry.

The surface of the polymer composition substrate, surface-modified by the above-mentioned various methods, is enhanced in adhesion to the primer but problematically too unstable for permanent use. Moreover, there is a need to introduce a separate surface-processing line for the polymer composition substrates, resulting in a delay of manufacture, a troublesome need to consider the proceeding/succeeding process, and a resultantly increased burden of cost.

There is also disclosed a method of adding a specific adhesion-enhancing material to the polymer composition, in which method the polymer composition for enhancing adhesion is ready to attach to rolls, leading to actual difficulty of manufacture. Additionally, such an adhesion-enhanced composition as to show a remarkable performance has never so far been made or achieved.

SUMMARY OF THE INVENTION

In an attempt to seek measures for improving adhesion of substrates obtained from a polymer composition to a primer, the inventors of the present invention have contrived an adhesion enhancer prepared as a medium by supporting an organic compound capable of chemical coupling to the primer on a porous material or an adhesion enhancer in the form of a master batch obtained by mixing the above-prepared medium with a polymer, and a polymer composition substrate prepared by adding the adhesion enhancer to a general polymer composition, thereby enhancing the adhesion strength of the substrates to the primer due to the functional groups chemically coupled to the primer.

Generally, a release agent is applied to permit easy removal of a molded polymer product from a mold in the preparation of substrates from a polymer composition. The substrates show a poor adhesion due to the release agent left over on the surface of the polymer composition when a primer is applied to the surface of the substrates without removal of the release agent by solvent cleaning. But the substrates prepared by adding the adhesion enhancer of the present invention to the polymer composition hardly deteriorate in the adhesion performance to the primer even when the release agent is not washed out with a solvent.

This is assumably because the porous material supporting an organic compound having a specific functional group easily migrates to the surface of the polymer composition to adsorb the release agent remaining on the surface of the polymer composition or drive the entirely spread release agent into a corner, forcing the release agent to a specific area in the form of a web hanging on the surface of the substrates.

It is therefore an object of the present invention to provide an adhesion enhancer contained in a polymer composition for achieving a good adhesion between a primer and polymer composition substrates.

The adhesion enhancer of the present invention is suitable for polymer compositions that are especially supposed to attach to a primer having an isocyanate group.

It is another object of the present invention to provide a polymer composition containing the adhesion enhancer.

To achieve the above objects of the present invention, an adhesion enhancer contained in a polymer composition is prepared as a medium by supporting 10 to 130 parts by weight of an organic compound having a boiling point of more than 120° C. on 100 parts by weight of a porous material having a specific surface area of more than 2 m$^2$/g, the organic compound including an alcohol, phenol or another organic compound having a hydroxyl group of the alcohol or phenol and another functional group.

Another adhesion enhancer contained in a polymer composition is prepared in the form of a master batch obtained by mixing a medium with 80 to 400 parts by weight of a polymer based on 100 parts by weight of a porous material having a specific surface area of more than 2 m$^2$/g, the medium being obtained by supporting 10 to 130 parts by weight of an organic compound having a boiling point of more than 120° C. on 100 parts by weight of the porous material, the organic compound including an alcohol, phenol or another organic compound having a hydroxyl group of the alcohol or phenol and another functional group.

A polymer composition as provided according to the present invention includes a base polymer and polymer additives. The polymer composition includes, based on 100 parts by weight of the base polymer, 0.5 to 25.0 parts by weight of an adhesion enhancer obtained by supporting 10 to 130 parts by weight of an organic compound having a boiling point of more than 120° C. on 100 parts by weight of a porous material having a specific surface area of more than 2 m$^2$/g, the organic compound including an alcohol, phenol or another organic compound having a hydroxyl group of the alcohol or phenol and another functional group.

Another polymer composition as provided according to the present invention includes a base polymer and polymer additives. The polymer composition includes, based on 100 parts by weight of the base polymer, 1.0 to 50.0 parts by weight of an adhesion enhancer in the form of a master batch obtained by mixing a medium with 80 to 400 parts by weight of a polymer based on 100 parts by weight of a porous material having a specific surface area of more than 2 m$^2$/g, the medium being obtained by supporting 10 to 130 parts by weight of an organic compound having a boiling point of more than 120° C. on 100 parts by weight of the porous material, the organic compound including an alcohol, phenol or another organic compound having a hydroxyl group of the alcohol or phenol and another functional group.

The present invention can be described in detail as follows.

The present invention is directed to an adhesion enhancer contained in a polymer composition that helps achieve a high reactivity with a primer having an isocyanate group (—NCO) even without any surface process, and a polymer composition containing the adhesion enhancer.

The adhesion enhancer for polymer composition substrate according to the present invention is a medium prepared by supporting an alcohol, a phenol, or other organic compounds having hydroxyl groups of the alcohol or phenol and another functional group on a porous material; or a master batch obtained by mixing the medium with a defined amount of another polymer.

The porous material sufficiently supports the alcohol, phenol or another organic compound having a hydroxyl group of the alcohol or phenol and another functional group and drives them into the surface of the polymer composition substrate, helping the hydroxyl group of the alcohol, the phenol, or the organic compound contact the isocyanate group of the primer.

The role of a porous material that functions as described above can be seen in the case of, for example, porous silica used for easy removal of overlying films from each other. The porous silica, which is called in this case "anti-blocking agent", migrates to the surface of the films and modifies the films, keeping the films from a bonding to each other, as well known to those skilled in the art.

Hence, the present invention adopts the fact that a porous material such as the porous silica, if mixed with a resin and molded into a specific form, migrates to the surface of the polymer composition substrates.

The porous material of the present invention includes particles having pore size ranging from several angstroms (Å) to several micrometers (μm), which may be either natural or synthesized (artificially manufactured).

The specific examples of the porous material of the present invention may include, if not specifically limited to, porous materials of silica, zeolite, pearlite, diatomite earth, or mulite; porous materials of fly ash, pumice or scoria; Si—, Ce—, Nb—, P—, Ge—, Al—, Ca—, B—, Mg—, Zn— or Ti-based porous materials or composite ceramic porous materials thereof; SiC— or C-based porous materials; organic porous materials; or artificially manufactured porous materials such as aerated concrete. Any kind of porous material may be used if only it has pores of which the shape can be observed with a microscope.

Preferably, the porous material is not ready to shape change of pores (as the pores clog or destroy) at the usual temperature of manufacture of polymer substrates (between 120 and 140° C.).

Though the shapes of the porous material and the pores are not specifically limited, the distribution amount of the pores in the porous material must be taken into consideration. The distribution amount of the pores, which can be observed with a microscope, is hard to quantify and substituted by "specific surface area". In principle, the porous material is far greater in specific surface area than non-porous powder of the same particle diameter.

With a porous material having a specific surface area of below 2 m$^2$/g, the load-supporting ability for an alcohol, a phenol or another organic compound having a hydroxyl group of the alcohol or phenol and another functional group deteriorates, resulting in the reduced effect of the present invention. Hence, the specific surface area of the porous material is preferably more than 2 m$^2$/g.

Porous materials of smaller particle size have a greater specific surface area. The specific surface area characterizes every porous material of a specific particle size. Porous materials of pearlite, scoria and aerated concrete, for example, have a small specific surface area of about 2 m$^2$/g with the mean particle size of 10 to 15 μm, even in which case the performance of the porous material according to the present invention can be much achieved.

Non-porous powder having an mean particle size of 10 to 15 μm shows a small specific surface area of below 1 m$^2$/g, so they cannot support an alcohol, a phenol or another organic compound having a hydroxyl group of the alcohol or phenol and another functional group, which are simply coated on the surface of the non-porous powder. With the addition of the non-porous material to a polymer composition, an alcohol, a phenol or another organic compound having a hydroxyl group of the alcohol or phenol and another functional group simply coated on the surface of the powder are not contained in the surface of the substrates but released from the surface of the powder into the polymer composition, losing their effect or migrating to the surface of the substrates (causing "migration").

Preferably, the porous material of the present invention has a specific surface area of 2 to 1000 m$^2$/g.

The adhesion performance can also be enhanced by simply adding, based on 100 parts by weight of a polymer, more than 2 parts by weight of an organic compound having a hydroxyl group to the polymer composition substrates, polishing the surface of the polymer composition substrates, applying a primer and then joining the polymer composition substrates together with an adhesive. An excess of the organic compound having a hydroxyl group added to the polymer composition may cause migration and deteriorate the properties of the polymer composition substrates. Hence, the conventional polymer composition substrates are not allowed to include more than 2 parts by weight of the organic compound based on 100 parts by weight of the polymer.

Contrarily, the present invention hardly shows migration or deterioration in the property of polymer composition substrates even with an excess of an alcohol, a phenol or another organic compound having a hydroxyl group of the alcohol or phenol and another functional group. This is because of the porous material. More specifically, the micro-pores of the porous material serve as a buffer for the excess of alcohol, phenol or another organic compound having a hydroxyl group of the alcohol or phenol and another functional group to prevent migration or deterioration of properties.

The particle size of the porous material in manufacture of molded products may be less than 500 μm. The porous material of the larger particle size results in a coarse surface of molded products with poor appearance and makes it difficult to achieve a uniform distribution on the surface of the molded products.

The specific examples of silica for the porous material may include Aerosil (Japan Aerosil Co., Ltd.), Sildex (Asahi Glass Co., Ltd.), E220(Nippon Silica Industrial Co., Ltd.), Sylysia (Fuji Silycia Chemical Co., Ltd.), SG (Nippon Sheet Glass Co., Ltd.), Zeosil (Rhodia), or the like, which products have a specific surface area of more than 100 m²/g.

The organic compound supported on the porous material preferably has a functional group reactive to the functional groups of a primer coated on the polymer composition substrates. In consideration of adhesion to a primer having an isocyanate group, the organic compound of the present invention more preferably has a hydroxyl group and may include, if not specifically limited to, an alcohol, a phenol or another organic compound having a hydroxyl group of the alcohol or phenol and another functional group.

The amount of an alcohol, a phenol or another organic compound having a hydroxyl group of the alcohol or phenol and another functional group as supported on the porous material is preferably 10 to 130 parts by weight based on 100 parts by weight of the porous material. Less than 10 parts by weight of the organic compound supported on the porous material is insignificant in effectiveness, while more than 130 parts by weight of the organic compound causes migration when added to the polymer composition in the subsequent process, adversely affecting the polymer composition.

The organic compound having a hydroxyl group as used in the present invention may include, for example, alcohols; phenols; or other organic compounds having a hydroxyl group of the alcohols or phenols and another functional group.

The specific examples of the alcohols may include methylalcohol, ethylalcohol, n-propylalcohol, n-butylalcohol, n-hexylalcohol, n-heptylalcohol, n-octylalcohol, n-decylalcohol, n-tetradecylalcohol, n-hexadecylalcohol, n-octadecylalcohol, isopropylalcohol, isobutylalcohol, sec-butylalcohol, tert-butylalcohol, isopentylalcohol, active-amylalcohol, tert-pentylalcohol, cyclopentanol, cyclohexanol, allylalcohol, crotylalcohol, methylvinylcarbinol, benzylalcohol, α-phenylethylalcohol, β-phenylethylalcohol, diphenylcarbinol, triphenylcarbinol, cinnamylalcohol, ethylene glycol, propylene glycol, 1,3-propanediol, glycerol, pentaerythritol, cetanol ($CH_3(CH_2)_{15}OH$), laurylalcohol ($CH_3(CH_2)_{11}OH$), or the like.

The specific examples of the phenols may include phenol, cresol, fluorophenol, chlorophenol, bromophenol, iodophenol, aminophenol, nitrophenol, 2,4-dinitrophenol, 2,4,6-trinitrophenol, catechol, resorcinol, hydroquinone, or the like.

The other organic compounds having a hydroxyl group of the alcohols or phenols and another functional group may include, for example, hydroxyaldehydes such as glycolaldehyde ($OHCCH_2OH$), aldol ($CH_3CH(OH)CH_2CHO$), salicylic aldehyde ($C_7H_6O_2$), or salicylic acid ($C_7H_6O_3$); or hydroxyketones such as acetol ($CH_3COCH_2OH$), acetoin ($CH_3COCH(OH)CH_3$), or benzoin ($C_6H_5COCH(OH)C_6H_5$). Other useful compounds having a hydroxyl group are dihydroxyacetone ($C_3H_6O_3$), dihydroxyphenylalanine, glucose, or the like.

Beside the organic compounds, there can be used a polymer such as polyethylene glycol, polypropylene glycol, polyglycerin, or polytetramethylene glycol.

In preparation of a polymer composition substrate for shoe sole from a polymer composition, plasticity is provided to the polymer composition at a raised temperature and the plastic polymer composition is then molded. This molding temperature must be taken into consideration in selecting the organic compound having a hydroxyl group as supported on the porous material in preparing an adhesion enhancer. The use of an organic compound having a boiling point below the molding temperature causes an unwanted foaming of the polymer composition substrates and a release of the components supported on the porous material to the air, thereby reducing the components actually effective in adhesion enhancement. The organic compound having a hydroxyl group must be selected that does not have a boiling point below the molding temperature. The molding temperature of the polymer composition is, if not in a narrow range, about 90 to 110° C. in the rubber industry and higher than 120° C. for another polymers. Hence, the boiling point of an organic compound having a hydroxyl group as supported on the porous material is preferably more than 120° C., more specifically about 150° C. and, most preferably 120 to 400° C.

An alcohol, a phenol or another organic compound having a hydroxyl group of the alcohol or phenol and another functional group are supported on the porous material and added to a normal polymer composition, which is then processed into a molded product. Due to the characteristic of the porous material present on the surface of the molded product, the hydroxyl group of the organic compound supported reacts with the isocyanate group of the primer to form a urethane bond.

The following reaction formula 1 summarizes the reaction mechanism of the organic compound having a hydroxyl group and the primer having an isocyanate.

Reaction Formula 1

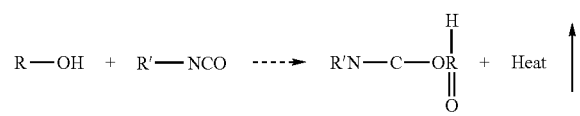

The urethane bond is produced as the alcohol having an active hydroxyl group (—OH) and an isocyanate compound participate in an addition polymerization reaction while generating a heat of reaction.

The primer having an isocyanate group may include a modified polyurethane-based primer, an isocyanate-based primer, a chloroisocyanate-based promer, or other primers having an isocyanate group and another functional group, or these primers using UV as a photo initiator.

But the urethane bond to the primer is not formed simply by coating or mixing alcohol, phenol or another organic compound having a hydroxyl group and another function group rather than supporting them on the porous material.

In the rubber industry, for example, silica is used as a stiffener and an alcohol such as polyethylene glycol is added to the rubber composition in consideration of the dispersability or processibility of silica. More specifically, Korean Patent Laid-Open No. 2004-0098913 discloses the preparation of a master batch with a large content of silica as a filler to offer good processibility. Here, the silica master batch includes a thermoplastic resin or a mixture of thermoplastic resins as a substrate, and additives to the substrate mixture, such as silica, silane-based coupling agent, processed oil, and activator. The activator as disclosed in the cited document is any one selected from diethylene glycol, polyethylene glycol, PE wax, or high boiling point alcohol. The alcohol added as an activator in the preparation of a silica master batch serves as a dispersing agent for silica, functioning in a different way from the organic compound having a hydroxyl group added in consideration of a urethane bond to the primer having an isocyanate group and supported on a porous material according to the present invention. Moreover, the organic compound having a hydroxyl group cannot be supported on the silica but simply mixed with it even though the silica used is a porous material, achieving neither objects of the present invention.

The cited document mentions the advantages of the silica master batch such as reduced silica dust, easy quality control of rubber products and clean working environment to improve worker's health and working environment, without saying that the addition of such a silica master batch to a rubber composition may improve adhesion strength.

Japanese Patent Laid-Open No. H04-091168 (Nisshin Kagaku Kogyo kk) discloses that silica used as a filler of rubber is modified for its dispersability and property improvement. More specifically, 0.1 to 20 parts by weight of acetylene alcohol is used based on 100 parts by weight of silica in an attempt to improve dispersability of silica. When added to the adhesion enhancer of the present invention, acetylene alcohol volatizes at a molding temperature of above 120° C., leading to a weak bond to the primer with uselessness in improvement of adhesion performance.

U.S. Pat. No. 5,777,013 discloses a composition for enhancing dispersability of silica and adhesion strength in an elastomer. The composition includes 60 to 98.9% of elastomer, 1 to 40% of silica, and 0.1 to 20% of A-B-A block copolymer, where block A includes rosin acid and fat acid; and block B includes PEG+PECH (polyepichlorohydrin) polyol having a molecular weight of 200 to 2500. The A-B-A copolymer is coated on silica powder. But the A-B-A copolymer does not have enough reactive hydroxyl groups, and the adhesion performance deteriorates because of the use of rosin acid and fat acid, failing to provide the function of the organic compound having a hydroxyl group in the present invention.

As can be seen from the cited documents, the conventional methods disclose the use of polyhydric alcohol such as polyethylene glycol in consideration of dispersability or processibility of inorganic powder such as silica. The polyethylene glycol is not supported on the surface of silica even when the silica is a porous material. The organic compound having a hydroxyl group as coated on the powder surface is not present on the surface of the substrates but released from the powder surface into the polymer composition. Even though a primer having an isocyanate group is coated on the surface of the polymer composition substrates, there hardly occurs a reaction of the hydroxyl group with the isocyanate group for producing a urethane bond.

The adhesion performance of the primer may be somewhat enhanced by polishing the surface of the polymer composition substrates and driving the organic compound having a hydroxyl group as contained in the polymer composition substrates towards the surface of the polymer composition substrates.

This is based on the fact that non-porous powder contained in the polymer composition substrates is distributed in a too small amount on the surface of the substrates with the organic compound having a hydroxyl group being contained too stably in the substrates to cause a chemical reaction on the surface of the substrates, while a porous material drives the organic compound having a hydroxyl group to the surface of the polymer composition substrates to make the hydroxyl group of the organic compound react with the isocyanate group on the surface of the substrates.

The adhesion enhancer of the present invention may be a medium prepared by supporting an alcohol, a phenol or another organic compound having a hydroxyl group of the alcohol or phenol and another functional group on a porous material, or a master batch obtained by mixing the medium with a primer.

In preparation of an adhesion enhancer in the form of a master batch, the polymer used may be any polymer selected in consideration of the polymer composition to be added subsequently and include, if not specifically limited to, elastic polymer, hard polymer, or soft polymer.

For the master batch type adhesion enhancer, the content of the polymer is preferably in the range of 80 to 400 parts by weight based on 100 parts by weight of the porous material. Less than 80 parts by weight of the polymer is too small in amount to yield a master batch, while an excess of the polymer in more than 400 parts by weight reduces the relative amount of alcohol, phenol or another organic compound having a hydroxyl group or another functional group and requires to add an excess of the master batch containing the adhesion enhancer to the polymer composition substrates, thereby deteriorating the properties of the polymer composition substrates.

The adhesion enhancer thus obtained can be used to prepare a polymer composition. The term "polymer composition" as used herein refers to a composition including any compositions, raw rubber or polymer, other polymer additives that are normally used for the fabrication of molded polymer products. The polymer additives may include antioxidant, filler, pigment, activator, coupling agent, crosslink agent, vulcanization accelerator, foaming agent, or the like.

The adhesion enhancer, if added to the polymer composition in the form of a medium, may be used in the range of 0.5 to 25 parts by weight based on 100 parts by weight of the polymer in the polymer composition. Preferably, the added amount of the adhesion enhancer is in the range of 1.0 to 25 parts by weight based on 100 parts by weight of the polymer.

An excess of the adhesion enhancer in more than 25 parts by weight based on 100 parts by weight of the polymer causes a change in the properties of the polymer product and, in the worse case, a deterioration of all properties. With less than 0.5 part by weight of the adhesion enhancer, the adhesion strength of polymer products is excessively weak even when the polymer products are coated with a primer having an isocyanate group and joined together with an adhesive having a good bond to the primer.

In consideration of this fact, the master batch type adhesion enhancer is preferably added in an amount of 1.0 to 50.0 parts by weight based on 100 parts by weight of the polymer.

In addition to the adhesion enhancer, the polymer composition includes a base polymer such as elastic polymer, hard polymer or soft polymer, and additives used for a normal polymer composition, which is well known to those skilled in the art and can be performed without a highly specialized experiment. The specific examples of the base polymer may be any polymer and include, if not specifically limited to, natural rubber, synthetic rubber, polyethylene, polypropylene (PP), polystyrene (PS), polyvinyl chloride (PVC), polyvinylidene chloride (PVDC), fluororesin, acryl resin, vinyl polyacetate resin, nylon, EVA resin, polyamide resin (PA), polycarbonate (PC), acetal resin, polyphenylene oxide, polyester, polysulfon, polyimide (PI), phenol resin, epoxy resin, melamine resin, urea resin, unsaturated polyester resin, alkide resin, quartz resin, polyurethane resin, ionomer, or the like.

In preparation of the polymer composition using an adhesion enhancer, preferably, the adhesion enhancer is first prepared and then mixed with other ingredients of the polymer composition.

The substrate obtained from the polymer composition of the present invention can be used for shoes. A shoe consists of four parts, mid-sole, outsole, insole and upper.

The present invention follows the standards of adhesion strength in the footwear industry, specifying the adhesion strength of outsole, mid-sole and upper to be more than 2.5 kg/cm.

The mid-sole is formed from a phylon or urethane material by injection foam molding, extrusion foam molding, or compression molding, and the outsole is formed mainly from rubber by extrusion foam molding or compression molding. The manufacturing methods of mid-sole and outsole are well known in the art and are not described in detail.

Especially in the manufacture of shoes, the porous adhesion enhancer supporting an organic compound is used in a greater amount for foamed polymer composition substrates (obtained from phylon or the like) than for non-foamed polymer composition substrates, due to its less movement towards the surface of the foamed substrates by nature of foam molding. This results from the specific gravity of individual particles of the porous material, and the adhesion enhancer assumably migrates more easily to the surface of the foamed polymer composition when the porous material has a lower specific gravity.

BRIEF DESCRIPTION OF THE DRAWINGS

The above and other objects and aspects of the present invention will be more clearly understood from the following detailed description taken in conjunction with the accompanying drawings, in which.

DETAILED DESCRIPTION OF THE PREFERRED EMBODIMENTS

Figure 1:
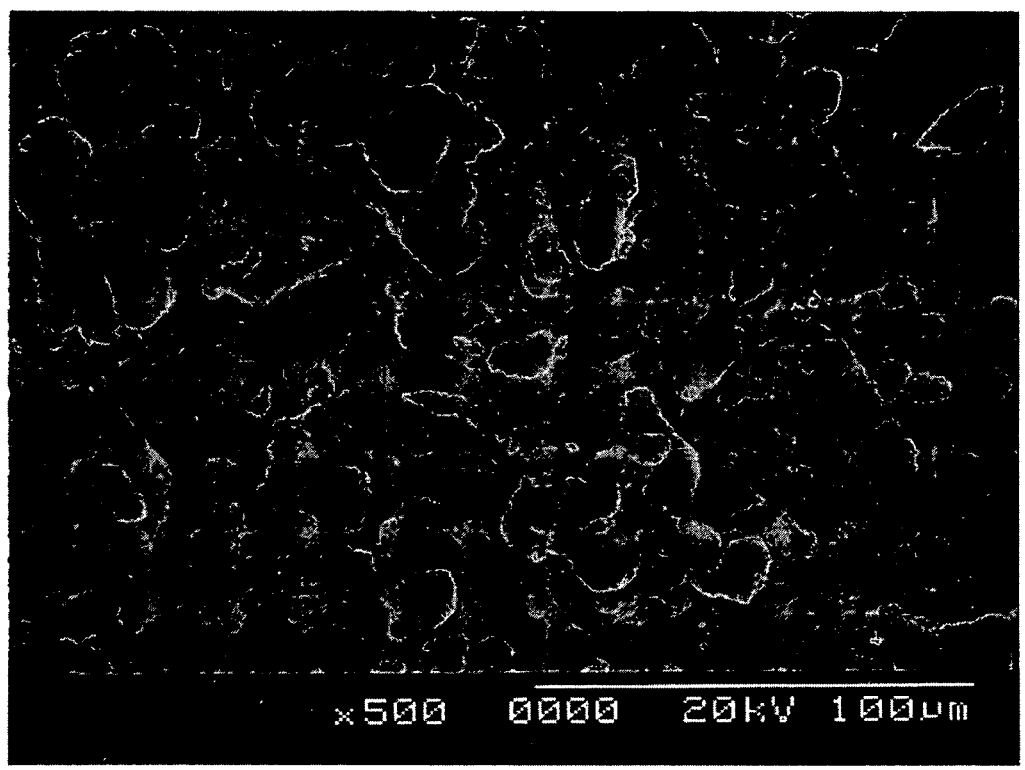
FIG. 1 is a photograph showing the surface of a general polymer substrate according to Comparative Example 1.

Hereinafter, the present invention will be described in detail by way of the following examples and with reference to the accompanying drawings, which are not intended to limit the scope of the present invention. Unless stated otherwise, the term "content" in the compositions of the following examples and comparative examples is understood as "part by weight".

Examples 1 to 10

According to Table 1, 100 parts by weight of a porous material including at least one selected from the group consisting of silica, porous material of quartz nitride, and zeolite (used alone or a mixture of two or more of them) was added to a mixer. Then, an organic compound having a hydroxyl group including at least one selected from the group consisting of glycerol, polyethylene glycol, polypropylene glycol, copolymer polyol, and hydroquinone (used alone or a mixture of two or more of them) was added in an amount as presented in Table 1, while kept in a liquid state at a raised temperature of 110 to 150° C. After 20 minutes of mixing, the organic compound having a hydroxyl group was supported on a porous material to prepare an adhesion enhancer.

The porous material as used herein was a porous material of quartz nitride prepared according to a known method, more specifically, as disclosed in Korean Patent No. 231401. According to the cited patent, 4 vol. % yttrium oxide having a mean particle diameter of 0.55 μm was added to a type quartz nitride powder having a mean particle diameter of 0.5 μm (99% a rate), and mixed using ethanol as a solvent with a ball mill for 72 hours. The oxygen content of the a type quartz nitride powder was 2.0 wt. %.

The mixed powder thus obtained was dried, mixed with a resin used as a molding aid and molded with a 100 mm×100 mm mold under a pressure of 35 kg/cm$^2$. The molded body was about 15 mm in thickness and about 42% in relative density irrespective of its composition. Heat treatment was then supported out at a temperature of 1,800° C. under an atmospheric pressure of 4 atm for 2 hours to yield a porous material of quartz nitride. The porous material was milled with a jet mill into porous powder having a mean particle size of 40 μm.

The ingredients of the adhesion enhancer are as presented in Table 2.

Separately, a raw rubber such as natural rubber, styrene-butadiene rubber, or ethylene-propylene rubber was added in a defined amount as presented in Table 1 to a kneader and blended by mastication for a defined period of time. Then, an activator, a process aid, a filler and each adhesion enhancer obtained previously were added in a defined content as presented in Table 1 and processed by mastication with rolls. The kneader temperature was a polymer processible temperature (100 to 200° C.) and the mixing time was about 15 minutes.

The compound thus obtained was aged for more than 30 minutes after the mastication step and then used. While mixed in an open roll mill, the compound was blended with a vulcanization accelerator and sulfur and mixed for about 2 to 3 minutes into a sheet having a thickness of 4 to 5 mm. The completed sheet was aged for more than 30 minutes and then molded.

The compound prepared was measured in regard to crosslink characteristic at 155° C. with an ODR (Oscillating Disk Rheometer) to determine the optimal vulcanization time (t90) and processed into a flat sheet according to the optimal vulcanization time under the pressure of 150 kg/cm$^2$.

The fabrication of samples and the measurement method as performed herein followed KS M 3725. More specifically, a plurality of sheet samples having a uniform thickness of 3 mm were manufactured and coated with D-PLY 007 (isocyanate-based primer, Dongsung NSC Co., Ltd.) on the one side thereof without being surface-processed (In the same manner, the surface of each sample is neither washed with a solvent nor polished in all the following examples and comparative examples). Subsequently, the samples were kept at 60° C. in a drier for 30 minutes, removed from the drier and coated with Aquace W-01 (urethane-based additive, Dongsung NSC Co., Ltd.). Two of the samples overlapped with each other were compressed, kept at 60° C. in a drier for 30 minutes, measured in regard to initial adhesion strength (handling strength), kept in the atmosphere for 48 hours, and measured in regard to peel strength. The results are presented in Table 6.

Examples 11, 12 and 13

These examples provide polymer compositions according to the composition for phylon mid-sole of shoes. An adhesion enhancer was prepared with the compositions as presented in Table 3 in the same manner as described in Example 1. The adhesion enhancer thus obtained as well as a crosslinking agent, a foaming agent and other additives were mixed with a polymer according to the composition and the content as presented in Table 3. The compound thus obtained was processed in the sheet form, put into a closed mold, and processed with a press machine under high-temperature and high-pressure conditions for 20 to 30 minutes. After removal of the crosslinking agent and the foaming agent, the compound was subjected to the primary press process in which the mold is momentarily opened to remove pressure and use the resultant pressure difference in rapid expansion of the compound, thereby forming a primary foamed material having a soft independent bubble structure.

The primary foamed material was cut in defined thickness and size with a skiving machine and a cutter and sent to the trimming and grinding line taken by a skilled worker. Then, the sample was put into a sample-shaped mold and sent to the hot press line at 150 to 160° C. for 5 to 20 minutes. With the mold closed, the sample was cooled down at a low temperature of about 10 to 20° C. for 10 to 20 minutes, and removed from the mold in the repress line to produce a substrate of a desired shape. The substrate thus obtained was coated with D-PLY P-5-2 (isocyanate-based UV type primer, Dongsung NSC Co.) and subjected to drying and UV irradiation. The substrate was processed into a sample and measured in regard to adhesion strength in the same manner as described in Example 1. The results are presented in Table 5.

Examples 14 and 15

An adhesion enhancer was prepared according to the composition of Table 3 in the same manner as described in Example 1, and a polymer composition was then prepared according to the composition and content of Table 3 in the same manner as described in Example 1. The fabrication of samples and the measurement methods were performed as described in Example 1. The results are presented in Table 5.

Examples 16, 17 and 18

These examples disclose the use of a master batch type adhesion enhancer. First, as presented in Table 3, an organic compound having a hydroxyl group was supported on a porous material and a defined amount of the resultant material was put into a kneader. After addition of a polymer to the kneader, the materials were sufficiently mixed at a polymer processible temperature for 15 minutes to prepare a master batch type adhesion enhancer.

Subsequently, as presented in Table 3, the master batch type adhesion enhancer previously prepared, natural rubber, silica, polyethylene glycol, an activator, a process aid, and a filler were put into the kneader, mixed for about 15 minutes and subjected to mastication with rolls. The compound thus obtained was aged for more than 30 minutes after mastication and put to use. The subsequent preparation method, the sample fabrication and the measurement method were performed as described in Example 1. The results are presented in Table 5.

Example 19

As presented in Table 3, an adhesion enhancer was prepared from, based on the total amount of the polymer composition, 3.0 out of 40 parts by weight of silica and 1.5 out of 2 parts by weight of polyethylene glycol in the same manner as described in Example 1. Based on the total weight of the polymer composition, 5.0 out of 100 parts by weight of natural rubber (NR) was added to a kneader and sufficiently mixed at a polymer processible temperature for 15 minutes.

Subsequently, as presented in Table 3, there were added the rest of natural rubber 95.0 (=100 minus 5.0) parts by weight, the rest of silica 37.0 (=40 minus 3.0) parts by weight, the rest of polyethylene glycol 0.5 (=2 minus 1.5) part by weight, and an activator, a process aid, and a filler. The mixture was well mixed in the kneader for about 15 minutes and then subjected to mastication with rolls. The compound thus obtained was aged for more than 30 minutes after mastication and put to use. The subsequent preparation method, the sample fabrication and the measurement method were performed as described in Example 1. The results are presented in Table 5.

TABLE 1

| | Div. | Example | | | | | | | | | |
| --- | --- | --- | --- | --- | --- | --- | --- | --- | --- | --- | --- |
| | | 1 | 2 | 3 | 4 | 5 | 6 | 7 | 8 | 9 | 10 |
| Adhesion enhancer | Silica | 100 | 100 | 100 | — | — | — | 50 | 50 | — | — |
| | Quartz nitride | — | — | — | 100 | 100 | — | 50 | — | 50 | 80 |

TABLE 1-continued

|  |  |  | Example | | | | | | | | | |
|---|---|---|---|---|---|---|---|---|---|---|---|---|
|  |  | Div. | 1 | 2 | 3 | 4 | 5 | 6 | 7 | 8 | 9 | 10 |
|  |  | Zeolite | — | — | — | — | — | 100 | — | 50 | 50 | 20 |
|  |  | Glycerol | 15 | 50 | 120 | — | — | — | — | — | 50 | — |
|  |  | Polyethylene glycol | — | — | — | 20 | 110 | — | 30 | — | — | — |
|  |  | Polypropylene glycol | — | — | — | — | — | 50 | 20 | 30 | — | — |
|  |  | Copolymer polyol | — | — | — | — | — | — | — | 20 | — | — |
|  |  | Hydroquinone | — | — | — | — | — | — | — | — | — | 50 |
| A[1] | B[2] | Subtotal | 115 | 150 | 220 | 120 | 210 | 150 | 150 | 150 | 150 | 150 |
|  |  | Natural rubber | 100 | 100 | 100 | 100 | 100 | 100 | — | — | — | — |
|  |  | Styrene-butadiene rubber | — | — | — | — | — | — | 100 | 100 | — | — |
|  |  | Ethylene-propylene rubber | — | — | — | — | — | — | — | — | 100 | 100 |
|  |  | Stearic acid | 1 | 1 | 1 | 1 | 1 | 1 | 1 | 1 | 1 | 1 |
|  |  | Butylated hydroxytoluene | 1 | 1 | 1 | 1 | 1 | 1 | 1 | 1 | 1 | 1 |
|  |  | Zeosil 155 | 40 | 40 | 40 | 40 | 40 | 40 | 40 | 40 | 40 | 40 |
|  |  | Titan dioxide | 4.8 | 4.8 | 4.8 | 4.8 | 4.8 | 4.8 | 2.9 | 2.9 | 0.98 | 0.98 |
|  |  | Carbon black | 0.2 | 0.2 | 0.2 | 0.2 | 0.2 | 0.2 | 0.1 | 0.1 | 0.02 | 0.02 |
|  |  | Zinc oxide | 5 | 5 | 5 | 5 | 5 | 5 | 5 | 5 | 5 | 5 |
|  |  | Polyethylene glycol | 2 | 2 | 2 | 2 | 2 | 2 | 2 | 2 | 2 | 2 |
|  |  | Si-69 | 4 | 4 | 4 | 4 | 4 | 4 | 4 | 4 | 4 | 4 |
|  |  | 2-merceptobenzothiazole | 1.5 | 1.5 | 1.5 | 1.5 | 1.5 | 1.5 | 1.5 | 1.5 | 1.5 | 1.5 |
|  |  | 2-benzothiazoyl disulfide | 1.5 | 1.5 | 1.5 | 1.5 | 1.5 | 1.5 | 1.5 | 1.5 | 1.5 | 1.5 |
|  |  | Tetramethylthiurame disulfide | 0.1 | 0.1 | 0.1 | 0.1 | 0.1 | 0.1 | 0.1 | 0.1 | 0.1 | 0.1 |
|  |  | Sulfur | 1.5 | 1.5 | 1.5 | 1.5 | 1.5 | 1.5 | 1.5 | 1.5 | 1.5 | 1.5 |
|  |  | Subtotal (Polymer Composition) | 162.6 | 162.6 | 162.6 | 162.6 | 162.6 | 162.6 | 160.6 | 160.6 | 158.6 | 153.6 |
|  | C[3] | D[4] | 9.0 | 5.0 | 0.7 | 7.7 | 3.4 | 5.0 | 5.0 | 5.0 | 5.0 | 5.0 |

Note)
A[1]: Polymer composition containing adhesion enhancer.
B[2]: Polymer composition.
C[3]: Adhesion enhancer
D[4]: Content (by weight) based on 100 parts by weight of polymer content in polymer composition

TABLE 2

| | Div | Brand Name | Manufacturer |
|---|---|---|---|
| Porous Material | Silica | Zeosil 155 (Specific Surface Area: 140-170 m²/g) | Rhodia Silica Korea Co., Ltd. |
| | Quartz nitride | Specific Surface Area: 7-52 m²/g | Known Preparation Method |
| | Zeolite | Specific Surface Area: 120-330 m²/g | Nippon Chemical Industrial Co., Ltd. |
| Organic Compound | Alcohol Glycerol | GL300 | Samwoo Oil Chemical Co., Ltd. |
| | Polyethylene glycol | MONOPOL PEG200, PEG1000, PEG4000 | Dongnam Chemical Ind., Ltd. |
| | Polypropylene glycol | P425 P4000 | Dow Chemical Company |
| | Copolymer Polyol | Specflex NC700 | Dow Chemical Company |
| | Phenol Hydroquinone | Reagent | Mitsui Chemicals, Inc. |

TABLE 3

| | | Div. | Example 11 | 12 | 13 | 14 | 15 | 16 | 17 | 18 | 19 |
|---|---|---|---|---|---|---|---|---|---|---|---|
| Adhesion enhancer | | Silica | 100 | 50 | 50 | 100 | 10 | 100 | 100 | 100 | 3.0 |
| | | Quartz nitride | — | 30 | 10 | — | — | — | — | — | — |
| | | Zeolite | — | 20 | 40 | — | — | — | — | — | — |
| | | Glycerol | 50 | — | — | 60 | — | 15 | — | — | — |
| | | Polyethylene glycol | — | 30 | 20 | — | — | — | — | — | 1.5 |
| | | Polypropylene glycol | — | 40 | — | — | 30 | — | 40 | — | — |
| | | Copolymer polyol | — | — | 40 | — | — | — | — | 100 | — |
| | | Nature rubber | — | — | — | — | — | 90 | 200 | 350 | 5 |
| | | Subtotal | 150 | 150 | 160 | 160 | 130 | 205 | 340 | 550 | 9.5 |
| A[1] | B[2] | Ethylene vinyl acetate | 60 | 60 | 60 | — | — | — | — | — | — |
| | | Ethylene olefin copolymer (DF810) | 20 | 20 | 20 | — | — | — | — | — | — |
| | | Ethylene olefin copolymer (DF940) | 20 | 20 | 20 | — | — | — | — | — | — |
| | | Polyethylene | — | — | — | 100 | — | — | — | — | — |
| | | Polypropylene | — | — | — | — | 100 | — | — | — | — |
| | | Nature rubber | — | — | — | — | — | 100 | 100 | 100 | 95 |
| | | Zeosil 155 | — | — | — | — | — | 40 | 40 | 40 | 37 |
| | | Polyethylen Glycol | — | — | — | — | — | 2 | 2 | 2 | 0.5 |
| | | Butylated Hydroxy Toluene | — | — | — | — | — | 1 | 1 | 1 | 1 |
| | | TiO₂ | — | — | — | — | — | 4.8 | 4.8 | 4.8 | 4.8 |
| | | Carbon Black | — | — | — | — | — | 0.2 | 0.2 | 0.2 | 0.2 |
| | | ZnO | — | — | — | — | — | 5 | 5 | 5 | 5 |
| | | Si-69 | — | — | — | — | — | 4 | 4 | 4 | 4 |
| | | 2-Mercaptobenzothiazole | — | — | — | — | — | 1.5 | 1.5 | 1.5 | 1.5 |
| | | 2-Benzothiazoly disulfide | — | — | — | — | — | 1.5 | 1.5 | 1.5 | 1.5 |
| | | Tetramethylthiuram disulfide | — | — | — | — | — | 0.1 | 0.1 | 0.1 | 0.1 |
| | | Sulfur | — | — | — | — | — | 1.5 | 1.5 | 1.5 | 1.5 |
| | | Stearic Acid | 1 | 1 | 1 | — | — | 1 | 1 | 1 | 1 |
| | | Magnesium Carbonate | 14 | 14 | 14 | — | — | — | — | — | — |
| | | 80% TiO₂ Master batch | 10 | 10 | 10 | — | — | — | — | — | — |
| | | 80% ZnO Master batch | 4 | 4 | 4 | — | — | — | — | — | — |
| | | Dicumyl peroxide | 0.8 | 0.8 | 0.8 | — | — | — | — | — | — |
| | | Modified Azodicarbonamide | 14 | 14 | 14 | — | — | — | — | — | — |
| | | Subtotal (Polymer Composition) | 143.8 | 143.8 | 143.8 | 100 | 100 | 162.6 | 162.6 | 162.6 | 153.1 |
| | C[3] D[4] | | 16.0 | 22.0 | 20.0 | 3.0 | 3.0 | 45 | 20 | 2.2 | — |

Note:
A[1]: Polymer composition containing adhesion enhancer.
B[2]: Polymer composition,
C[3]: Adhesion enhancer,
D[4]: Content (by weight) based on 100 parts by weight of polymer content in polymer composition Comparative Examples 1 to 4

These comparative examples are to study the adhesion performance of a polymer composition without the adhesion enhancer of the present invention, in comparison with the polymer composition of the present invention. The composition is defined as presented in Table 4. To prepare the polymer composition, a polymer such as natural rubber, styrene-butadiene rubber, or ethylene-propylene rubber was added to a kneader and blended by mastication for a defined period of time. Then, an activator, a process aid, and a filler were added to the adhesion enhancer previously prepared, and the compound was masticated with rolls. The kneader temperature was a polymer processible temperature and the mixing time was about 15 minutes. The compound thus obtained was aged for more than 30 minutes after the mastication step and put to use. While mixed in an open roll mill, the compound was blended with a vulcanization accelerator and sulfur and mixed for about 2 to 3 minutes into a sheet having a thickness of 4 to 5 mm. The completed sheet was aged for more than 30 minutes and then molded. The compound prepared was measured in regard to crosslink characteristic at 155° C. with an ODR (Oscillating Disk Rheometer) to determine the optimal vulcanization time (t90) and processed into a flat sheet according to the optimal vulcanization time under the pressure of 150 kg/cm².

The fabrication of samples and the measurement method were performed in the same manner as described in Example 1. The results are presented in Table 5.

Comparative Examples 5 and 6

These comparative examples are to provide a phylon midsole composition without the adhesion enhancer of the present invention. Samples were prepared with the composition and content as presented in Table 4 and measured in regard to adhesion strength in the same manner as described in Examples 11, 12 and 13. The results are presented in Table 5.

Comparative Examples 7 and 8

Samples were prepared with the composition and content as presented in Table 4 and measured in regard to adhesion strength in the same manner as described in Examples 14 and 15. The results are presented in Table 5.

Comparative Example 9

This comparative example provides a comparison of supporting effect of a porous material which is one component of the adhesion enhancer of the present invention. 100 parts by weight of magnesium carbonate as shown in Table 6 was added to a mixer instead of a porous material and mixed with 50 parts by weight of glycerol as an organic compound having a hydroxyl group at a raised temperature of 110 to 150° C. After 20 minutes of mixing, an additive coated with a sufficient amount of the organic compound having a hydroxyl group was finally formed.

In preparing the polymer composition of Comparative Example 1 according to Table 4, 5 parts by weight of the additive thus prepared based on 100 parts by weight of the polymer in the polymer composition was used. The fabrication of samples and the measurement method were performed in the same manner as described in Example 1. The results are presented in Table 5.

The following Table 6 summarizes chemical names, brand names and manufacturers of the individual chemicals used in the preparation of polymer compositions according to the examples and the comparative examples.

TABLE 4

| Div. | Comparative Example | | | | | | | | |
|---|---|---|---|---|---|---|---|---|---|
| | 1 | 2 | 3 | 4 | 5 | 6 | 7 | 8 | 9 |
| Nature Rubber | 100 | 100 | — | — | — | — | — | — | 100 |
| Styrene butadiene rubber | — | — | 100 | — | — | — | — | — | — |
| Ethylene propylene rubber | — | — | — | 100 | — | — | — | — | — |
| Ethylene vinyl acetate | — | — | — | — | 60 | 60 | — | — | — |
| Ethylene olefin copolymer (DF810) | — | — | — | — | 20 | 20 | — | — | — |
| Ethylene olefin copolymer (DF940) | — | — | — | — | 20 | 20 | — | — | — |
| Polyethylene | — | — | — | — | — | — | 100 | — | — |
| Polypropylene | — | — | — | — | — | — | — | 100 | — |
| Stearic Acid | 1 | 1 | 1 | 1 | 1 | 1 | — | — | 1 |
| Butylated Hydroxy Toluene | 1 | 1 | 1 | 1 | — | — | — | — | 1 |
| Zeosil 155 | 40 | 40 | 40 | 40 | — | — | — | — | 40 |
| Magnesium Carbonate | — | — | — | — | 14 | 14 | — | — | — |
| TiO₂ | 4.8 | 4.8 | 2.9 | 0.98 | — | — | — | — | 4.8 |
| 80% TiO₂ Master batch | — | — | — | — | 10 | 10 | — | — | — |
| Carbon Black | 0.2 | 0.2 | 0.1 | 0.02 | — | — | — | — | 0.2 |
| ZnO | 5 | 5 | 5 | 5 | — | — | — | — | 5 |
| 80% ZnO Master batch | — | — | — | — | 4 | 4 | — | — | — |
| Polyethylen Glycol | 2 | 3.5 | 2 | 2 | — | — | — | — | 2 |
| Si-69 | 4 | 4 | 4 | 4 | — | — | — | — | 4 |
| 2-Mercaptobenzothiazole | 1.5 | 1.5 | 1.5 | 1.5 | — | — | — | — | 1.5 |
| 2-Benzothiazolyl disulfide | 1.5 | 1.5 | 1.5 | 1.5 | — | — | — | — | 1.5 |
| Tetramethylthiuram disulfide | 0.1 | 0.1 | 0.1 | 0.1 | — | — | — | — | 0.1 |
| Dicumyl peroxide | — | — | — | — | 0.8 | 0.8 | — | — | — |
| Sulfur | 1.5 | 1.5 | 1.5 | 1.5 | — | — | — | — | 1.5 |
| Modified Azodicarbonamide | — | — | — | — | 14 | 14 | — | — | — |

TABLE 5

| | Adhesion Strength (kg/cm) | | |
|---|---|---|---|
| | Initial | After 48 hours | Peeling State |
| Example 1 | 4.2 | 7.9 | Polymer Substrate Partially Destroyed |
| Example 2 | 4.7 | 9.6 | Polymer Substrate Partially Destroyed |
| Example 3 | 4.6 | 6.1 | Polymer Substrate Partially Destroyed |
| Example 4 | 4.4 | 7.8 | Polymer Substrate Partially Destroyed |
| Example 5 | 4.5 | 9.6 | Polymer Substrate Partially Destroyed |
| Example 6 | 4.3 | 8.8 | Polymer Substrate Partially Destroyed |
| Example 7 | 4.3 | 8.7 | Polymer Substrate Partially Destroyed |
| Example 8 | 4.2 | 9.1 | Polymer Substrate Partially Destroyed |
| Example 9 | 4.5 | 9.3 | Polymer Substrate Partially Destroyed |
| Example 10 | 4.2 | 9.5 | Polymer Substrate Partially Destroyed |
| Example 11 | 4.3 | 5.7 | Foamed Polymer Substrate Destroyed |
| Example 12 | 4.1 | 5.5 | Foamed Polymer Substrate Destroyed |
| Example 13 | 3.9 | 6.2 | Foamed Polymer Substrate Destroyed |
| Example 14 | 3.9 | 11.4 | Polymer Substrate Partially Destroyed |
| Example 15 | 4.1 | 10.9 | Polymer Substrate Partially Destroyed |
| Example 16 | 3.3 | 5.3 | Polymer Substrate Partially Destroyed |
| Example 17 | 3.8 | 6.5 | Polymer Substrate Partially Destroyed |
| Example 18 | 4.2 | 8.1 | Polymer Substrate Partially Destroyed |
| Example 19 | 4.5 | 9.3 | Polymer Substrate Partially Destroyed |
| Comparative Example 1 | 0.9 | 1.5 | Peels from Adhesive Side |
| Comparative Example 2 | 1.0 | 1.7 | Peels from Adhesive Side |
| Comparative Example 3 | 0.8 | 1.6 | Peels from Adhesive Side |
| Comparative Example 4 | 1.1 | 1.7 | Peels from Adhesive Side |
| Comparative Example 5 | 0.2 | 0.7 | Peels from Adhesive Side |
| Comparative Example 6 | 0.3 | 0.6 | Peels from Adhesive Side |
| Comparative Example 7 | 0.3 | 0.8 | Peels from Adhesive Side |
| Comparative Example 8 | 0.2 | 0.7 | Peels from Adhesive Side |
| Comparative Example 9 | 0.7 | 0.8 | Peels from Adhesive Side |

TABLE 6

| | Div. | Brand Name | Manufacturer |
|---|---|---|---|
| Polymer | Nature rubber | SMR | Malaysia |
| | Styrene butadiene rubber | SBR1502 | Korea Kumho Petrochemical Co., Ltd. |
| | Ethylene propylene rubber | KEP210 | Kumbo Polychem |
| | Ethylene vinyl acetate | Elvax EP2288 | Dupont |
| | Ethylene olefin copolymer | Tafmer DF810 | Mitsui Chemical |
| | Ethylene olefin copolymer | Tafmer DF940 | Mitsui Chemical |
| | Polyethylene | 722-LDPE | Hanwha Chemical Coorporation |
| | Polypropylene | HIPP B1750 | Samsung Total Petrochemicals Co., Ltd. |
| Additive | Stearic Acid | SA-100B | LG Chem. Ltd. |
| Antioxidant | Butylated Hydroxy Toluene | Jinanti BHT | Jinyang Chemical Co., Ltd. |
| Filler | Silica | Zeosil 175 | Rhodia |
| | Magnesium Carbonate | Ball-TT | Dokuyama |
| Pigment | TiO2 | Ti-Pure | Dupont |
| | 80% TiO2 Master batch | Techem B75 TiO2 | Buwon Co., Ltd. |
| | Carbon Black | N600 | Korea Carbon Black Co., Ltd. |
| Activator | ZnO | ZnO 1 | Gilcheon Chemical Co., Ltd. |
| | 80% ZnO Master batch | Techem B80 ZnO | Buwon Co., Ltd. |
| | Polyethylen Glycol | PEG4000 | Korea Polyol Co., Ltd. |
| Coupling Agent | Bis(triethoxysilylpropyl)polysulfide | Si-69 | Degussa |
| Crosslink | 2-Mercaptobenzothiazole | ORICEL M 75 | DC Chemical Co., Ltd. |
| Accelerator | 2-Benzothiazolyl disulfide | ORICEL DM 75 | DC Chemical Co., Ltd. |
| | Tetramethylthiuram disulfide | ORICEL TT 75 | DC Chemical Co., Ltd. |
| Crosslink | Dicumyl peroxide | DCP | Nippon Oil |
| Agent | Sulfur | Rubber | Miwon Commercial Co., Ltd. |
| Foaming Agent | Modified Azodicarbonamide | DX-74MT | Dongjin Semichem Co., Ltd. |

As can be seen from Table 5, the polymer compositions (Examples 1 to 18) including the adhesion enhancer of the present invention as prepared by supporting an alcohol, a phenol or another organic compound having a hydroxyl group of the alcohol or phenol and another functional group on a porous material show a remarkably enhanced adhesion strength of polymer composition substrates to a primer, relative to the polymer composition without the adhesion enhancer of the present invention. A comparison between Example 19 and Comparative Example 1, both of which use a same amount of rubber, filler or polyethylene glycol, adhesion enhancement can be achieved only by supporting a defined amount of polyethylene glycol on a defined amount of silica porous material, adding a defined amount of rubber in the form of a master batch, and mixing the master batch with the other components (in Example 19).

In regard to a deterioration in adhesion strength due to the residual of a release agent used in preparation of a polymer molded product, a release agent (Kf96, silicon, ShinEtu) was applied to molds for molded substrates of Examples 17 and 18 and Comparative Example 1. Adhesion strength was then measured for the samples removed of the residual release agent from the surface of the molded substrates and those not removed of the residual release agent. The results are presented in Table 7.

hydroxyl group is excessively small on the surface of the substrate, the adhesion strength to the primer is achieved assumably according to the Anchoring theory.

Figure 3:
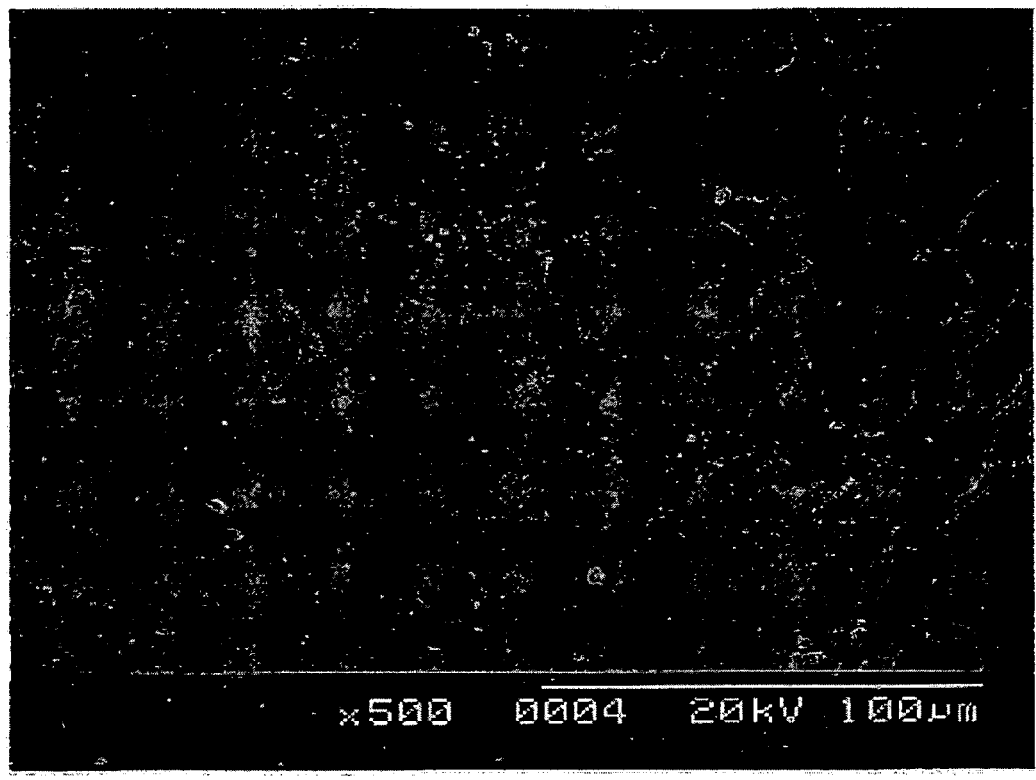
FIG. 3 is a photograph showing the surface of a polymer substrate according to Example 1 of the present invention.
Figure 6:
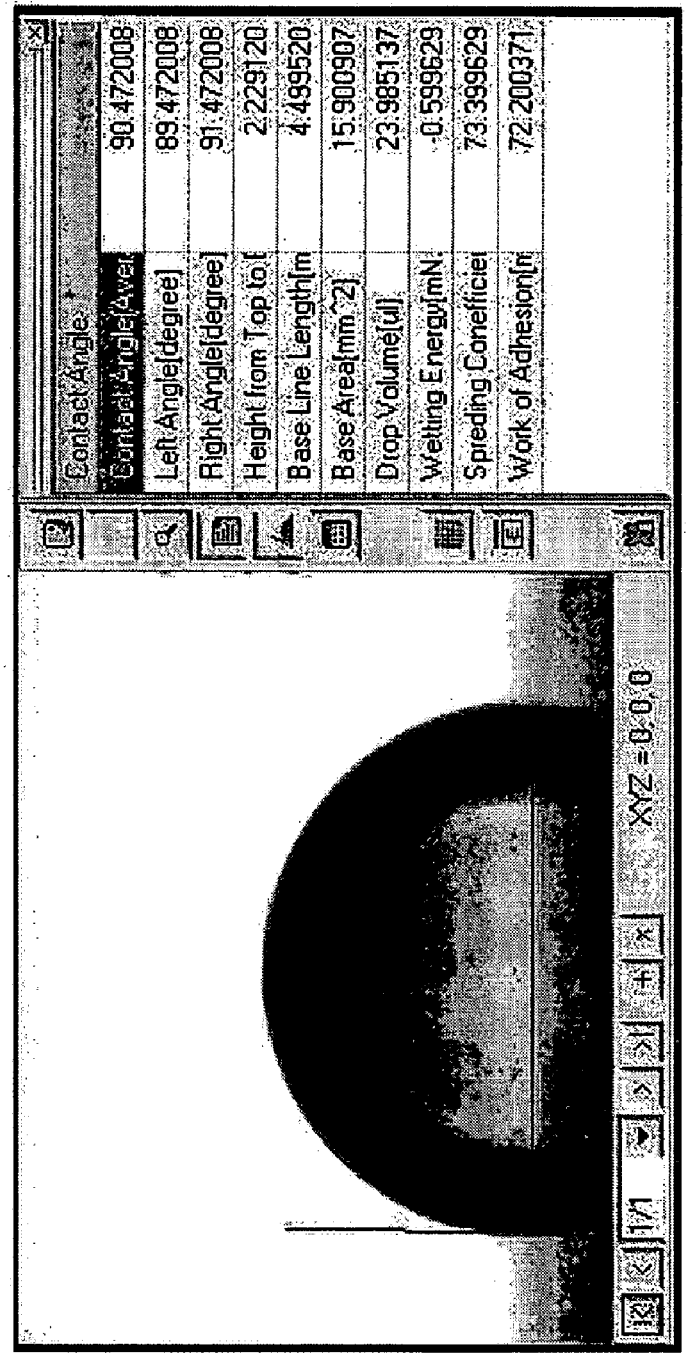
FIG. 6 shows the measurement of contact angle on the surface of the polymer substrate according to Example 1 of the present invention.

FIG. 3 shows the surface of the polymer substrate containing the adhesion enhancer of the present invention. The surface of the polymer substrate in FIG. 3 is smoother than the surface of the conventional polymer substrate shown in FIG. 1 but contains a large distribution amount of hydroxyl groups as shown in FIG. 6. Accordingly, the present invention assumably does not achieve adhesion strength by the Anchoring theory but through a chemical bond between the hydroxyl group and the isocyanate group.

Figure 7:
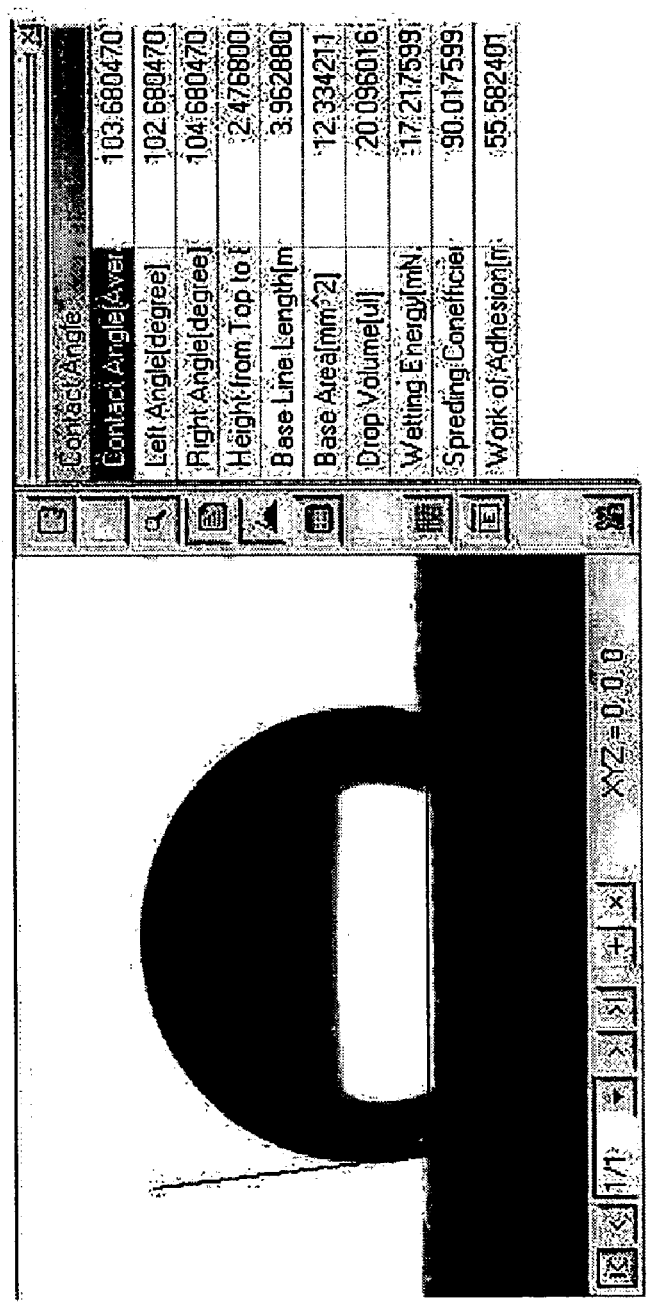
FIG. 7 shows the measurement of contact angle on the surface of a polymer substrate with an organic compound coated on a non-porous material according to Comparative Example 9.

As can be seen from the reduced contact angle in FIG. 7, where an alcohol, a phenol or another organic compound having a hydroxyl group of the alcohol or phenol and another functional group is coated on a non-porous material and added to a polymer composition, the organic compound hav-

TABLE 7

| Div. Polymer Composition + Adhesion enhancer | Example | | | | Comparative Example | |
|---|---|---|---|---|---|---|
| | 17 | 17 | 18 | 18 | 1 | 1 |
| Cleaning of Release Agent | No | Yes | No | Yes | No | Yes |
| Surface Polishing of Substrate | No | No | No | No | No | No |
| Adhesion Strength (kg/cm) | 6.4 | 6.5 | 7.9 | 8.1 | 0.7 | 1.5 |
| Adhesion Strength Difference | 0.1(1.5% decline) Adhesion strength of above 2.5 | | 0.2(2.5% decline) Adhesion strength of above 2.5 | | 0.8(53% decline) Adhesion strength of below 2.5 | |

As can be seen from Table 7, the adhesion enhancer of the present invention maintains adhesion strength without washing out the residual release agent.

For a more thorough study on the effect of the adhesion enhancer of the present invention, the surface of polymer composition substrates was analyzed by means of a scanning electron microscope (Scanning Probe Microscope, SPA-400, Seiko Instruments) and a contact angle measurer (Surface and Elecrro-Optics, SEO 300A, SEO, water used as fluid).

Figure 2:
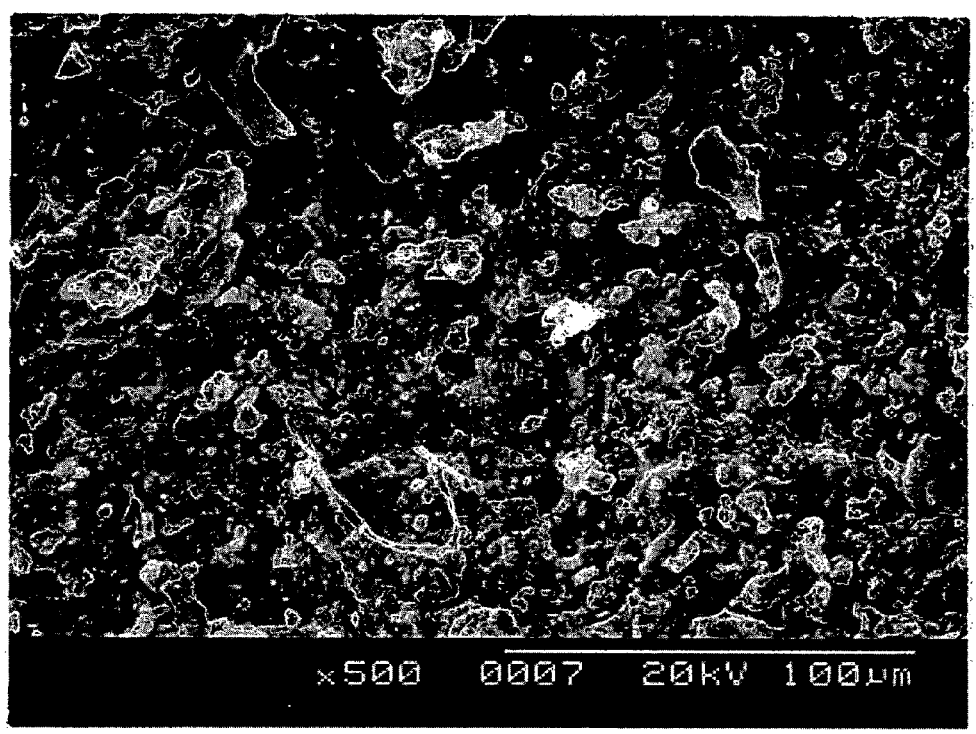
FIG. 2 is a photograph showing the surface of a polymer substrate surface-polished to enhance adhesion.

FIG. 1 is a photograph showing the surface of a general polymer substrate according to Comparative Example 1; FIG. 2 is a photograph showing the surface of a polymer substrate surface-polished to enhance adhesion; and FIG. 3 is a photograph showing the surface of a polymer substrate according to Example 1 of the present invention.

Figure 4:
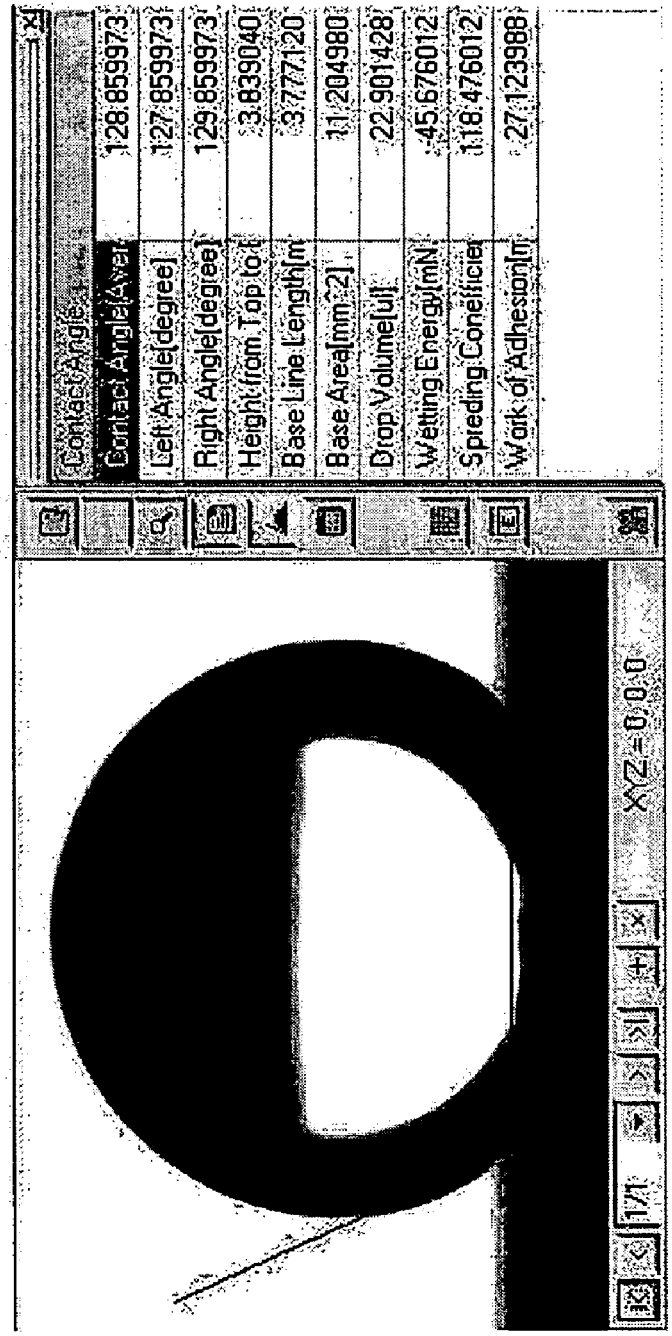
FIG. 4 shows the measurement of contact angle on the surface of the general polymer substrate according to Comparative Example 1.
Figure 5:
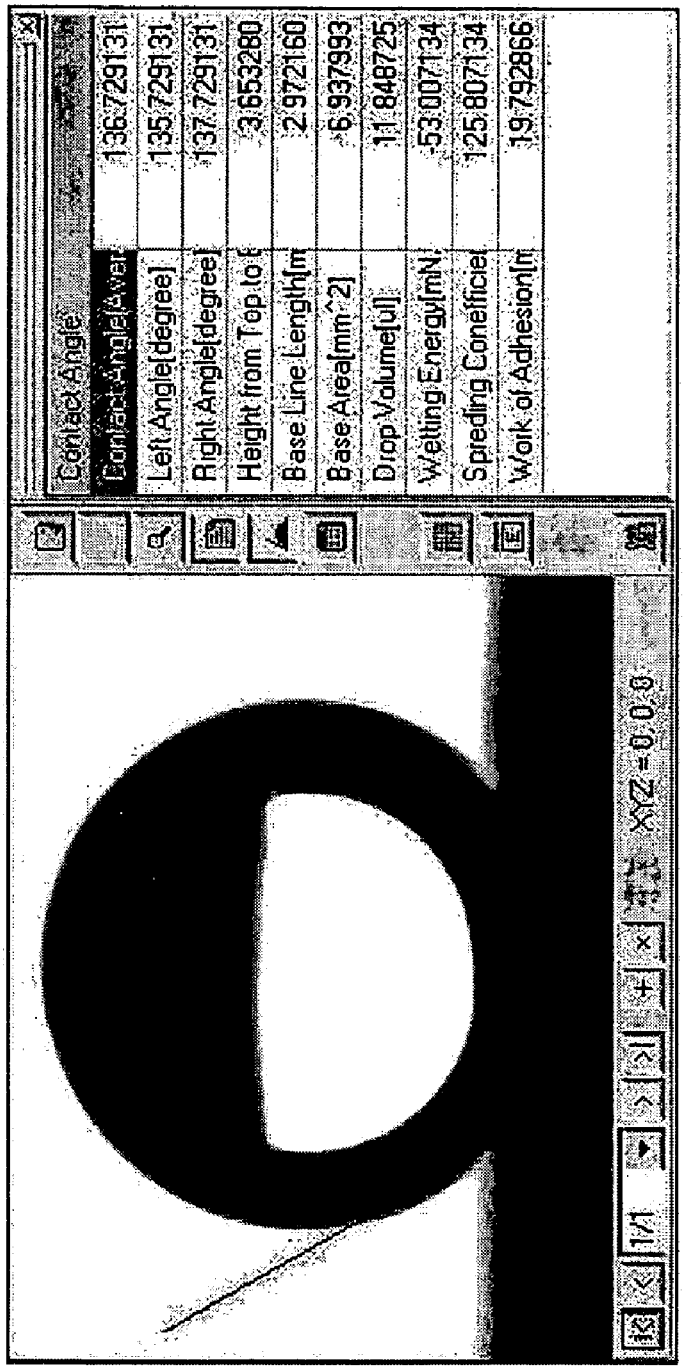
FIG. 5 shows the measurement of contact angle on the surface of the general polymer substrate surface-polished to enhance adhesion according to Comparative Example 1.

FIG. 4 shows the measurement of contact angle on the surface of the general polymer substrate according to Comparative Example 1; FIG. 5 shows the measurement of contact angle on the surface of the general polymer substrate surface-polished according to Comparative Example 1; FIG. 6 shows the measurement of contact angle on the surface of the polymer substrate according to Example 1 of the present invention; and FIG. 7 shows the measurement of contact angle on the surface of a polymer substrate with an organic compound coated on a non-porous material according to Comparative Example 9.

The adhesion theories include Anchoring, Adsorption theory, Diffusion theory, Electrical theory, Fowkes theory, and so forth.

In view of the adhesion theory, the conventional method of polishing the surface of a polymer substrate provides a coarse surface as shown in FIG. 2. As can be seen indirectly from FIG. 5, which shows that the distribution amount of the ing a hydroxyl group seems to be driven on the surface of the polymer composition substrate. But the adhesion strength is not enhanced at all as in Comparative Example 9 of Table 5. This is assumably because the organic compound coated on the non-porous material in preparation of the polymer composition does not have a strong bond to the non-porous material. The surface of this sample, when rubbed with a paper tissue, shows migration to leave a residue of the organic compound on the paper tissue. Hence, the adhesion enhancer can be used enough without migration only by supporting the organic compound on the porous material.

As described above in detail, the present invention provides a polymer composition containing an adhesion enhancer that includes an organic compound having a boiling point of more than 120° C. as supported on a porous material, or an adhesion enhancer that is a master batch prepared in the pellet or sheet form by mixing a polymer with an organic compound having a boiling point of more than 120° C. as supported on a porous material, the organic compound including an alcohol, a phenol or another organic compound having a hydroxyl group of the alcohol or phenol and another functional group. The addition of the adhesion enhancer to the polymer composition leads to good adhesion properties between the polymer composition substrates using a primer having an isocyanate group without a need of washing or polishing the surface of the polymer composition substrates, especially without washing out a release agent used for polymer composition molding. Therefore, the present invention is useful for adhesion of footwear or the like.

While this invention has been described in connection with the embodiments, it is to be understood to those skilled in the art that the invention is not limited to the disclosed embodiments, but, on the contrary, is intended to cover various modifications and equivalent arrangements. Particularly, the number of layers is flexible and the core/shell structure can have a gradient. Accordingly, the technical coverage of the present invention is to be included within the spirit and scope of the appended claims.

What is claimed is:

1. A polymer composition comprising:
   a) a base polymer;
   b) a filler;
   c) polymer additives; and
   d) an adhesion enhancer:
      i) an organic compound having a boiling point greater than 120° C., and
      ii) a porous material having a specific surface area greater than two square meters per gram,
   wherein, the organic compound is supported on the porous material,
   wherein the adhesion enhancer is first prepared and then mixed with the base polymer and the polymer additives,
   wherein the adhesion enhancer comprises 50 to 110 parts by weight of the organic compound based on 100 parts of the porous material,
   wherein the organic compound comprises at least one of alcohols, phenols, hydroxylaldehydes, hydroxyketones, dihydroxyacetones, dihydroxyphenylalanines, glucose, polyethylene glycol, polypropylene glycol, polyglycerine and poly tetra methylene glycol, and
   wherein the adhesion enhancer is added to the polymer composition to be joined to a primer having an isocyanate group so as to improve adhesion between the polymer composition and the primer.

2. The polymer composition according to claim 1, wherein the first organic compound has a boiling point greater than 150° C.

3. The polymer composition according to claim 1, wherein the polymer composition has an adhesion strength greater than 2.5 kg/cm.

4. An adhesion enhancer comprising:
   a) an organic compound having a boiling point greater than 120° C., and
   b) a porous material having a specific surface area greater than two square meters per gram,
   wherein the organic compound is supported on the porous material,
   wherein the adhesion enhancer comprises 50 to 110 parts by weight of the organic compound based on 100 parts of the porous material,
   wherein the organic compound comprises at least one of alcohols, phenols, hydroxylaldehydes, hydroxyketones, dihydroxyacetones, dihydroxyphenylalanines, glucose, polyethylene glycol, polypropylene glycol, polyglycerine and poly tetra methylene glycol, and
   wherein the adhesion enhancer is added to a polymer composition to be joined to a primer having an isocyanate group so as to improve adhesion between the polymer composition and the primer.

5. The adhesion enhancer according to claim 4, wherein the first organic compound has a boiling point greater than 150° C.

6. The adhesion enhancer according to claim 4, wherein the porous material includes at least one of silica, zeolite, diatomite earth, pearlite, mulite, fly ash, pumice, scoria, organic porous materials, aerated concrete, artificially manufactured porous materials, Si-based porous materials, SiC-based porous materials, C-based porous materials, Ce-based porous materials, Nb-based porous materials, P-based porous materials, Ge-based porous materials, Al-based porous materials, Ca-based porous materials, B-based porous materials, Mg-based porous materials, Zn-based porous materials, Ti-based porous materials, Si-based composite ceramic porous materials, Ce-based composite ceramic porous materials, Nb-based composite ceramic porous materials, P-based composite ceramic porous materials, Ge-based composite ceramic porous materials, Al-based composite ceramic porous materials, Ca-based composite ceramic porous materials, B-based composite ceramic porous materials, Mg-based composite ceramic porous materials, Zn-based composite ceramic porous materials, and Ti-based composite ceramic porous materials.

7. An adhesion enhancer comprising:
   a) a porous material;
   b) 80 to 400 parts by weight of a polymer based on 100 parts by weight of the porous material; and
   c) 10 to 130 parts by weight of an organic compound based on 100 parts of said porous material,
   wherein the organic compound is supported on the porous material,
   wherein the organic compound has a boiling point of greater than 120° C.,
   wherein the organic compound comprises at least one of alcohols, phenols, hydroxylaldehydes, hydroxyketones, dihydroxyacetones, dihydroxyphenylalanines, glucose, polyethylene glycol, polypropylene glycol, polyglycerine and poly tetra methylene glycol,
   wherein the porous material has a surface area of greater than two square meters per gram, and
   wherein the adhesion enhancer is added to a polymer composition to be joined to a primer having an isocyanate group so as to improve adhesion between the polymer composition and the primer.

8. The adhesion enhancer according to claim 7, wherein the organic compound has a boiling point greater than 150° C.

9. The adhesion enhancer according to claim 7, wherein the porous material includes at least one of silica, zeolite, diatomite earth, pearlite, mulite, fly ash, pumice, scoria, organic porous materials, aerated concrete, artificially manufactured porous materials, Si-based porous materials, SiC-based porous materials, C-based porous materials, Ce-based porous materials, Nb-based porous materials, P-based porous materials, Ge-based porous materials, Al-based porous materials, Ca-based porous materials, B-based porous materials, Mg-based porous materials, Zn-based porous materials, Ti-based porous materials, Si-based composite ceramic porous materials, Ce-based composite ceramic porous materials, Nb-based composite ceramic porous materials, P-based composite ceramic porous materials, Ge-based composite ceramic porous materials, Al-based composite ceramic porous materials, Ca-based composite ceramic porous materials, B-based composite ceramic porous materials, Mg-based composite ceramic porous materials, Zn-based composite ceramic porous materials, and Ti-based composite ceramic porous materials.

* * * * *